US008894779B2

(12) United States Patent
Hirai et al.

(10) Patent No.: US 8,894,779 B2
(45) Date of Patent: Nov. 25, 2014

(54) BEARING STEEL BEING EXCELLENT BOTH IN POST SPHEROIDIZING-ANNEALING WORKABILITY AND IN POST QUENCHING-TEMPERING HYDROGEN FATIGUE RESISTANCE PROPERTY

(75) Inventors: Yasumasa Hirai, Chiyoda-ku (JP); Kiyoshi Uwai, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 13/821,729

(22) PCT Filed: Nov. 24, 2011

(86) PCT No.: PCT/JP2011/006545
§ 371 (c)(1),
(2), (4) Date: Apr. 3, 2013

(87) PCT Pub. No.: WO2012/073458
PCT Pub. Date: Jun. 7, 2012

(65) Prior Publication Data
US 2013/0189147 A1    Jul. 25, 2013

(30) Foreign Application Priority Data

Nov. 29, 2010  (JP) ................................. 2010-265527
Feb. 25, 2011  (JP) ................................. 2011-040397

(51) Int. Cl.
| | |
|---|---|
| C22C 38/22 | (2006.01) |
| C21D 1/18 | (2006.01) |
| C21D 8/00 | (2006.01) |
| C22C 38/06 | (2006.01) |
| C22C 38/02 | (2006.01) |
| C21D 9/40 | (2006.01) |
| C21D 1/32 | (2006.01) |
| C22C 38/04 | (2006.01) |
| C22C 38/50 | (2006.01) |
| C22C 38/44 | (2006.01) |
| C22C 38/54 | (2006.01) |
| C22C 38/58 | (2006.01) |
| C22C 38/00 | (2006.01) |
| F16C 33/62 | (2006.01) |
| F16C 33/30 | (2006.01) |

(52) U.S. Cl.
CPC . *C22C 38/44* (2013.01); *C21D 1/18* (2013.01); *C21D 8/005* (2013.01); *C22C 38/06* (2013.01); *C22C 38/02* (2013.01); *F16C 33/62* (2013.01); *C21D 9/40* (2013.01); *C21D 1/32* (2013.01); *C22C 38/04* (2013.01); *C22C 38/50* (2013.01); *C22C 38/54* (2013.01); *F16C 33/30* (2013.01); *F16C 2204/70* (2013.01); *C22C 38/58* (2013.01); *C22C 38/001* (2013.01); *C22C 38/22* (2013.01); *F16C 2204/66* (2013.01); *C22C 38/002* (2013.01)
USPC ............ 148/334; 148/335; 420/105; 420/106

(58) Field of Classification Search
CPC ....................................................... C22C 38/22
USPC .......... 148/320, 330, 333–335; 420/105, 106, 420/108–110
See application file for complete search history.

(56) References Cited

U.S. PATENT DOCUMENTS

| | | |
|---|---|---|
| 6,402,658 B1 | 6/2002 | Yasuhara et al. |
| 6,423,158 B1 | 7/2002 | Maeda et al. |
| 2006/0081314 A1* | 4/2006 | Iwamoto et al. ............... 148/659 |

FOREIGN PATENT DOCUMENTS

| | | |
|---|---|---|
| CN | 1129465 A | 8/1996 |
| CN | 1211634 A | 3/1999 |

(Continued)

OTHER PUBLICATIONS

Sep. 2, 2013 Office Action issued by Korean Patent Office Application No. 13/821729 (with English translation).

(Continued)

*Primary Examiner* — Brian Walck
(74) *Attorney, Agent, or Firm* — Oliff PLC

(57) ABSTRACT

Provided is bearing steel excellent in post spheroidizing-annealing workability and in post quenching-tempering hydrogen fatigue resistance property. The bearing steel has a chemical composition containing, by mass %: 0.85% to 1.10% C; 0.30% to 0.80% Si; 0.90% to 2.00% Mn; 0.025% or less P; 0.02% or less S; 0.05% or less Al; 1.8% to 2.5% Cr; 0.15% to 0.4% Mo; 0.0080% or less N; 0.0020% or less O; and the balance being Fe and incidental impurities, to thereby effectively suppress the generation of WEA even in environment where hydrogen penetrates into the steel, so as to improve the rolling contact fatigue life and also the workability such as cuttability and forgeability of the material.

2 Claims, 2 Drawing Sheets

(56) References Cited

FOREIGN PATENT DOCUMENTS

| | | |
|---|---|---|
| CN | 1251622 A | 4/2000 |
| CN | 1745188 A | 3/2006 |
| CN | 101186995 A | 5/2008 |
| EP | 1 355 071 A1 | 10/2003 |
| EP | 1 595 966 A1 | 11/2005 |
| EP | 1 614 761 A1 | 1/2006 |
| JP | S-54-40226 | 3/1979 |
| JP | S-57-39163 | 3/1982 |
| JP | S-62-247055 | 11/1987 |
| JP | S-63-255345 | 10/1988 |
| JP | A-3-254339 | 11/1991 |
| JP | A-2000-201115 | 7/2000 |
| JP | A-2000-234128 | 8/2000 |
| JP | A-2002-060904 | 2/2002 |
| JP | A-2002-332542 | 11/2002 |
| JP | A-2004-124215 | 4/2004 |
| JP | A-2006-213981 | 8/2006 |
| JP | A-2007-262449 | 10/2007 |
| JP | A-2008-255399 | 10/2008 |
| JP | A-2010-236049 | 10/2010 |
| JP | A-2010-255095 | 11/2010 |

OTHER PUBLICATIONS

Jun. 4, 2013 International Preliminary Report on Patentability issued in International Application No. PCT/JP2011/006545.
Feb. 14, 2012 International Search Report issued in International Application No. PCT/JP2011/006545 (with translation).
Korean Patent Office, Official Decision of Refusal mailed Jan. 2, 2014 in Korean Patent Application No. 10-2013-7009490 w/English-language Translation.
Chinese Patent Office, Office Action mailed Jan. 6, 2014 in Chinese Patent Application No. 201180052654.3 w/English-language Translation.
Mar. 31, 2014 Supplementary European Search Report issued in EP 11 84 5154.
Korean Patent Office, Office Action mailed Jul. 10, 2014 in Korean Patent Application No. 2013-7009490 w/English-language Translation.

* cited by examiner

BEARING STEEL BEING EXCELLENT BOTH IN POST SPHEROIDIZING-ANNEALING WORKABILITY AND IN POST QUENCHING-TEMPERING HYDROGEN FATIGUE RESISTANCE PROPERTY

TECHNICAL FIELD

The present invention relates to bearing steel capable of suppressing bearing damage ascribable to white structure resulting from hydrogen, which has been a problem in bearing steel made by general bearing steel (JIS-SUJ2) for use in, for example, automobiles, windmills, and industrial machines, and further, the alloy contents in the bearing steel are suppressed so as to impart workability equivalent to that of SUJ2, to thereby provide bearing steel being excellent both in post spheroidizing-annealing workability and in post quenching-tempering hydrogen fatigue resistance property.

BACKGROUND ART

A bearing is required to have an excellent rolling contact fatigue life, and various studies have been hitherto made on the improvement of rolling contact fatigue life. An example of the bearing member includes a bearing for use as an alternator of an automobile. It has already been known that one of the major contributors to causing the rolling contact fatigue fracture in a bearing is microstructural change called white structure generated right on the rolling contact portion of the bearing, which results in a crack generated and extended in the bearing to cause fatigue fracture.

Here, the aforementioned white structure is categorized into the following three types:

(1) white structure (hereinafter, also referred to as WEA), which is randomly generated without having any specific orientation relationship relative to the rolling contact portion;

(2) white structure (similarly referred to as butterfly), which is generated on the periphery of a non-metal inclusion in a direction at 45°; and (3) white structure (similarly referred to as white band), which has orientations of about 80° and about 30° relative to the rolling contact portion.

In particular, the generation of WEA leads to a bearing fatigue fracture in a shorter time before reaching expected rating life of the bearing, and thus countermeasures against WEA are in strong demand.

The WEA is considered to be generated, as described in Patent Literature 1 (PTL 1), through the following mechanism. That is, a lubricant oil used in the bearing or a water penetrating into the bearing is decomposed through a tribochemical reaction to generate hydrogen, and the hydrogen thus generated penetrates into the steel and is accumulated therein so as to accelerate the generation of WEA.

As examples of measures to be taken to suppress the generation of WEA, Patent Literature 2 (PTL 2) proposes a method of increasing Cr content and N content to thereby increase the amount of retained austenite, and Patent Literature 3 (PTL 3) proposes a method of adding Ni alone or simultaneously adding Ni and Mo together.

CITATION LIST

Patent Literature

PTL 1: JP 2008-255399 A
PTL 2: JP 2007-262449 A
PTL 3: JP 2002-60904 A

SUMMARY OF INVENTION

Technical Problem

Meanwhile, in the manufacture of a bearing, a bearing steel material is subjected to cutting work or the like. For this reason, an excellent cutting workability is one of the important properties required for bearing steel. However, the technologies disclosed in PTL 1 to PTL 3 give no consideration or merely give general consideration to the workability in, for example, cutting work of the bearing steel.

The present invention has been made in view of the aforementioned circumstances, and has an object of providing bearing steel in which the generation of WEA is effectively suppressed so as to improve not only the rolling contact fatigue life even in environment where hydrogen penetrates into the steel from a lubricant oil or the like but also the workability of the material such as cuttability and forgeability, to thereby provide bearing steel being excellent both in post spheroidizing-annealing workability and in post quenching-tempering hydrogen fatigue resistance property.

Solution To Problem

The inventors of the present invention have made an extensive study to develop a steel material that has cuttability equivalent to that of general steel such as JIS-SUJ2, and has more excellent hydrogen fatigue resistance than SUJ2.

The study results are described in below. In the following description, the content of each element contained in steel, which is merely represented by %, all refers to mass %.

First, steel samples which were varied in contents of Si, Cr, and Mo, respectively, and charged with hydrogen were subjected to investigation of a rolling contact fatigue life $B_{10}$. A base steel material contained 0.9% C, 1% Mn, 0.016% P, 0.008% S, 0.025% Al, 0.003% N, and 0.0015% O. For comparison, a steel sample equivalent to general SUJ2 steel (containing: 1.05% C; 0.25% Si; 0.45% Mn; 0.016% P; 0.008% S; 0.025% Al; 1.45% Cr; 0.003% N; and 0.0010% O) was also subjected to investigation of the rolling contact fatigue life $B_{10}$. The test pieces were prepared and subjected to rolling fatigue test under the same conditions as those illustrated in Example to be described later.

The value of the rolling contact fatigue life $B_{10}$ obtained for each steel sample described above was divided by the value of the rolling contact fatigue life $B_{10}$ obtained for steel equivalent to SUJ2, to thereby evaluate the improvement of life relative to the general steel ($B_{10}$ Life Ratio=Life $B_{10}$/Life $B_{10}$ of Steel equivalent to SUJ2).

FIG. 1 shows the results thereof in order, with Si content on the abscissa and $B_{10}$ Life Ratio on the ordinate.

As is apparent from FIG. 1, the $B_{10}$ life ratio was improved 4 times or more when Si content is 0.3% or more in steel containing Cr by 1.8% or more and Mo by 0.15%. In contrast, the $B_{10}$ life hardly increased in steel containing Cr by 1.7% even if Mo was contained by 0.15% and Si was contained by 0.3% or more. Further, even in steel containing Cr by 1.8% or more, the $B_{10}$ life was not improved when Mo content was 0%, even if Si was contained to 0.3% or more.

Further, WEA was observed in a structure of an exfoliated portion of each test piece, and it was identified that all the exfoliation was ascribable to WEA.

It was found from the above that steel containing Cr by 1.8% or more, Si by 0.3% or more, and Mo by 0.15% or more is capable of delaying the development of WEA, to thereby improve the rolling contact fatigue life thereof.

Next, each steel that had been investigated for the rolling contact fatigue life as described above was subjected to outer periphery turning test, to thereby investigate the machinability thereof. The test was performed under the same conditions as those illustrated in Example to be described later, and measured was the time that elapsed before the tool reached the flank wear (hereinafter, referred to as tool life) of 0.2 mm. The machinability can be defined as excellent when the time is long. The tool life obtained for each steel was divided by the tool life for steel equivalent to SUJ2, to thereby evaluate the improvement of the tool life relative to general steel (Tool Life Ratio=Tool Life/Tool Life of Steel equivalent to SUJ2). FIG. 2 shows the results thereof in order, with Si content on the abscissa and Tool Life Ratio on the ordinate.

As shown in FIG. 2, the 1.8% Cr-0.15% Mo steel and the 2.5% Cr-0.15% Mo steel, which were high in value of the rolling contact fatigue life $B_{10}$, showed a steep decline in tool life when Si content exceeded 0.8%. The 2.7% Cr-0.15% Mo steel was low in value of the tool life irrespective of the Si content.

It was found from the above that Mo-containing steel with Cr content of 2.5% or less and Si content of 0.8% or less was capable of ensuring machinability equivalent to that of the general SUJ2 steel.

The present invention has been made based on the aforementioned findings, which has been completed in light of the results of investigation made on the Mo content capable of ensuring machinability, the rolling fatigue life obtained when hydrogen penetrates into the steel, and the influence of other chemical compositions on the machinability, and the gist of the present invention is as follows.

1. Bearing steel having a chemical composition containing, by Mass %:
   C: 0.85% to 1.10%;
   Si: 0.30% to 0.80%;
   Mn: 0.90% to 2.00%;
   P: 0.025% or less;
   S: 0.02% or less;
   Al: 0.05% or less;
   Cr: 1.8% to 2.5%;
   Mo: 0.15% to 0.4%;
   N: 0.0080% or less; and
   O: 0.0020% or less,
   with the balance being Fe and incidental impurities.

2. The bearing steel according to item 1 further contains, by mass %, at least one element selected from:
   Ti: 0.01% or less;
   Ni: 0.10% or less;
   Cu: 0.10% or less; and
   B: 0.0010% or less.

Advantageous Effect of Invention

According to the present invention, there may be obtained bearing steel that is not only excellent in workability in, for example, cutting work but also significantly improved in hydrogen fatigue resistance property as compared to general bearing steel, to thereby contribute to improving the rolling contact fatigue life of the bearing, which provides industrial beneficial effects.

BRIEF DESCRIPTION OF DRAWINGS

The present invention will be further described below with reference to the accompanying drawings, wherein.

DESCRIPTION OF EMBODIMENTS

Figure 1:
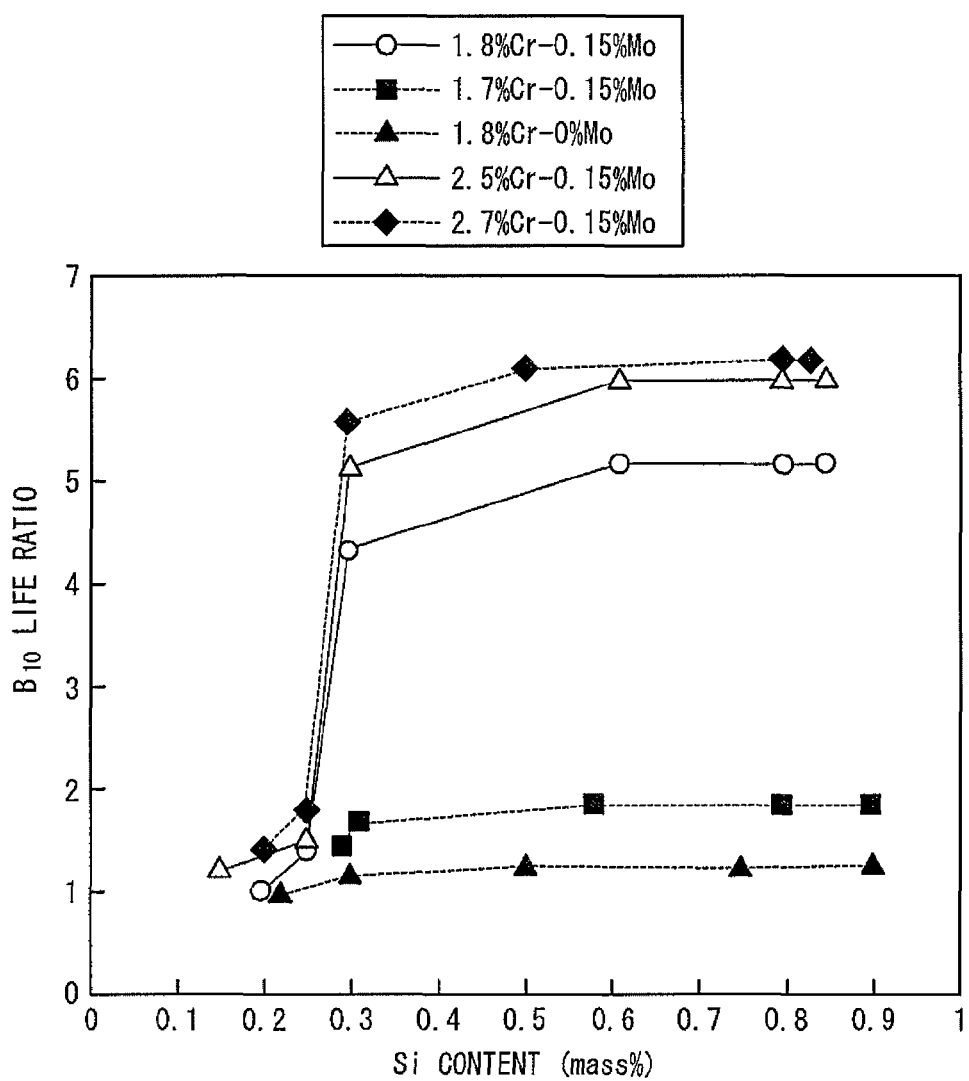
FIG. 1 is a graph showing how the rolling contact fatigue life $B_{10}$ is influenced by the contents of Si, Cr, and Mo.
Figure 2:
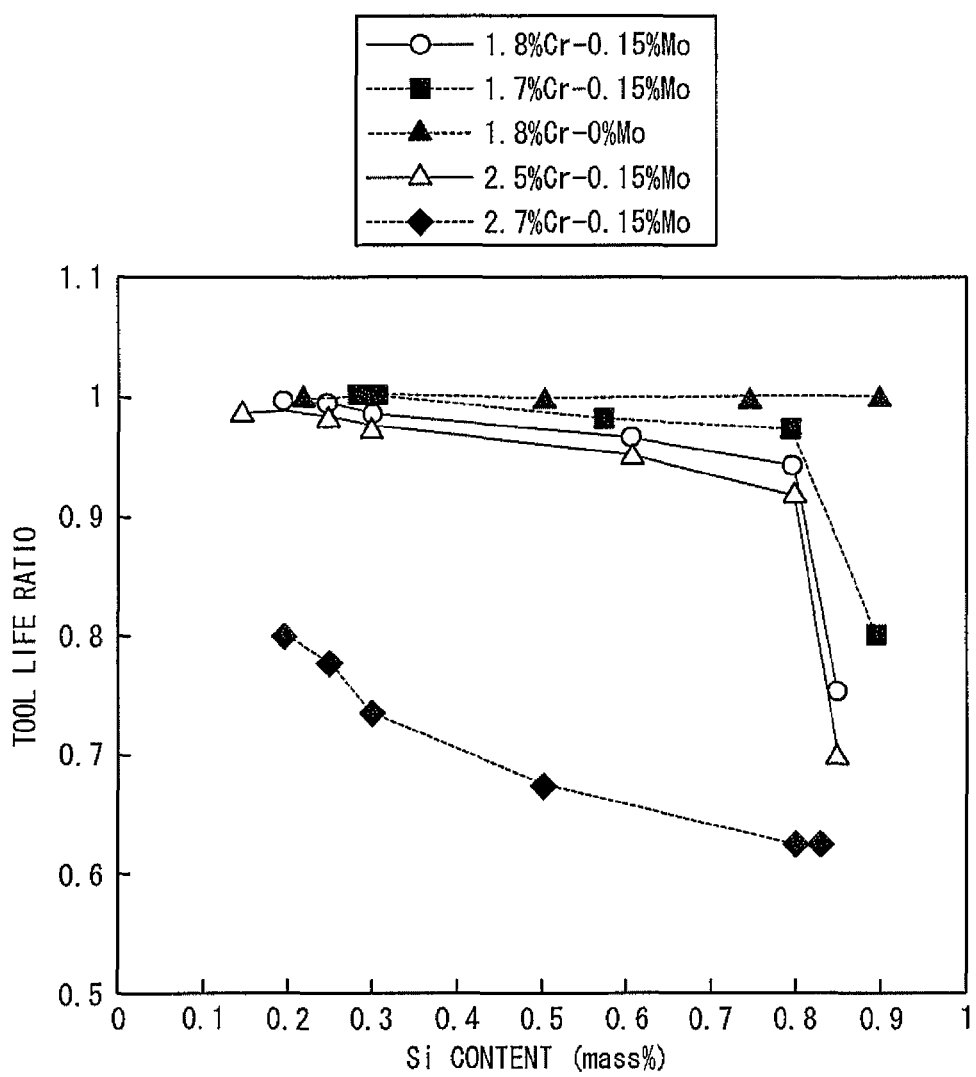
FIG. 2 is a graph showing how the tool life is influenced by the contents of Si, Cr, and Mo.

In the following, the bearing steel of the present invention is specifically described. First, the reasons for restricting the content of each chemical composition of the bearing steel of the present invention to the following ranges are described. In the following, the content (%) of each composition is mass %.

$$0.85\% \leq C \leq 1.10\%$$

Carbon (C) is an element needed for ensuring post quenching-tempering hardness and maintaining excellent rolling contact fatigue life of the bearing, and thus C needs to be contained by at least 0.85%. On the other hand, C content over 1.10% causes a coarse carbide to remain, which rather causes deterioration in rolling contact fatigue life. Therefore, the C content is defined to be in a range of 0.85% to 1.10%.

$$0.30\% \leq Si \leq 0.80\%$$

Silicon (Si) effectively contributes to improving hydrogen fatigue resistance property, which is a particularly important element in the present invention for ensuring the rolling contact fatigue life when hydrogen penetrates into the steel. As described above, Si content needs to be at least 0.30% to develop the aforementioned effect. However, Si content of more than 0.80% deteriorates machinability. Accordingly, Si content is defined to fall within a range of 0.30% to 0.80%, and more preferably, the lower limit may be 0.40%.

$$0.90\% \leq Mn \leq 2.00\%$$

Manganese (Mn) is necessary for ensuring post quenching-tempering hardness and maintaining at high level the rolling contact fatigue life of the bearing steel. For this purpose, Mn needs to be contained at least 0.90%. However, Mn content over 2.00% results in a deterioration in machinability. Therefore, Mn content is defined to fall within a range of 0.90% to 2.00%, preferably within a range of 0.90% to 1.35%, and more preferably in a range of 0.90% to 1.15%.

$$P \leq 0.025\%$$

Phosphorus (P) causes segregation at the grain boundaries of austenite to reduce the grain boundary strength, which leads to the generation of a quench crack during quenching. Therefore, P content is preferably reduced to minimum, whereas allowed up to 0.025%. Preferably, P content is 0.020% or less. P is industrially contained by more than 0%, but P content may be 0% if possible.

$$S \leq 0.02\%$$

Sulfur (S) forms manganese sulfide (MnS) in the steel so as to improve cuttability, and thus may be added. However, S content over 0.02% leads to a fracture origin in a rolling contact fatigue test, which may reduce rolling contact fatigue strength, and thus S content is 0.02% or less. S content is more preferably 0.01% or less. The aforementioned effect obtained through the formation of MnS can be obtained as long as S is contained at least to 0.0003%.

$$Al \leq 0.05\%$$

Aluminum (Al) is an element which effectively contributes to deoxidizing, and thus useful in producing ultra low oxygen steel. However, an aluminum oxide in the steel deteriorates rolling contact fatigue property, and therefore Al content should not be increased more than necessary. For this reason, Al content is 0.05% or less in the present invention. Al content that remains after deoxidization can be suppressed to about 0.004% at minimum.

$$1.8\% \leq Cr \leq 2.5\%$$

Chromium (Cr) is effective in suppressing the generation of white structure (WEA), and thus a particularly important element in the present invention. As shown in FIG. 1, Cr content below 1.8% does not have much effect of improving the rolling contact fatigue life by suppressing the generation of white structure in hydrogen atmosphere, whereas Cr content of more than 2.5% leads to an increase in cost while significantly deteriorating machinability. Therefore, Cr content is defined to fall within a range of 1.8% to 2.5%.

$$0.15\% \leq Mo \leq 0.4\%$$

Molybdenum (Mo) is effective in suppressing the generation of white structure (WEA), and thus an important element in the present invention. Here, Mo content of less than 0.15% does not have much effect of improving the rolling contact fatigue life by suppressing the generation of white structure in hydrogen atmosphere, whereas Mo content of more than 0.4% leads to an increase in cost while significantly deteriorating machinability. Therefore, Mo content is defined to fall within a range of 0.15% to 0.4%.

$$N \leq 0.0080\%$$

Nitrogen (N) forms a bond to Al and Ti, to thereby form a nitride or a carbonitride, which produces an effect of suppressing the growth of austenite during heating for quenching. On the other hand, however, a coarse nitride or carbonitride causes deterioration in rolling contact fatigue life. Accordingly, N content is 0.0080% or less, and preferably 0.0060% or less. The aforementioned effect produced by the formation of a nitride or a carbonitride can be obtained as long as N content is at least 0.0015%.

$$O \leq 0.0020\%$$

Oxygen (O) can be found as a hard oxide-based non-metal inclusion, and the oxide-based non-metal inclusion is coarsened along with the increase in the amount of O content. The coarsened inclusion particularly affects the rolling contact fatigue property, and therefore, O content is desirably reduced to minimum. Accordingly, O content needs to be reduced to at least 0.0020% or less, preferably 0.0010% or less. O is industrially contained by more than 0%, but O content may be 0% if possible.

In addition to the basic compositions described in the above, the present invention allows the following compositions to be added as appropriate, in addition to the aforementioned basic compositions.

$$Ti \leq 0.01\%$$

Titanium (Ti) forms a bond to nitrogen in the steel to form TiN, which produces the pinning effect in the austenite region to suppress grain growth. However, excessive amount of Ti results in a large amount of TiN precipitates, which deteriorates rolling contact fatigue life, and thus Ti content is 0.01% or less. To obtain the aforementioned effect, Ti content may preferably be at least 0.003%.

$$Ni \leq 0.10\%$$

Nickel (Ni) is an element for improving quench hardenability, and thus can be used for controlling quench hardenability. However, Ni is added up to 0.10%, because Ni is an expensive element and raises steel material price when added excessively. To obtain the aforementioned effect, Ni content is preferably at least 0.03%.

$$Cu \leq 0.10\%$$

Copper (Cu) is an element for improving quench hardenability, but allowed only up to 0.1% because Cu content over 0.1% is likely to hinder hot workability. To obtain the aforementioned effect, Cu content is preferably at least 0.03%.

$$B \leq 0.0010\%$$

Boron (B) is an element for improving quench hardenability, and thus can be used for controlling quench hardenability. However, B content over 0.0010% saturates the effect, and thus B may be added up to 0.0010%. To obtain the aforementioned effect, B content is preferably at least 0.0003%. In the bearing steel of the present invention, the balance other than the aforementioned compositions are Fe and incidental impurities.

A method of manufacturing the bearing steel with the aforementioned chemical compositions is not particularly limited, and any conventionally-known method may be employed to manufacture the bearing steel.

Specifically, steel prepared by steel making in a converter, a degassing system, or the like is casted to obtain a cast steel piece, which is subjected to diffusion annealing, rolling, or forging formation process, to thereby make a steel material of predetermined dimension. The steel material is subjected to spheroidizing annealing, so as to serve as a material to be processed as a bearing member.

Manufacturing conditions particularly preferred are exemplified as follows.

The spheroidizing annealing may preferably be performed by maintaining the steel at a temperature in a range of 750° C. to 820° C. for 4 hours to 16 hours, and then gradually cooling the steel to about 650° C. at a rate of about 8° C./h to 20° C./h. The microstructure of the material for processing that has been subjected to spheroidization annealing may preferably include ferrite and spheroidal cementite, and has Vickers hardness of preferably about 180 to 250.

The material for processing is processed to be in the shape of a bearing member, which is then subjected to quench hardening and tempering, so as to be obtained as a bearing member. If necessary, the material may be subjected to quench hardening and tempering before being processed in a member shape of final accuracy.

The quench hardening may preferably be operated by retaining the steel at 800° C. to 950° C. for about 15 minutes to 120 minutes, and then subjecting the steel to quenching such as oil quenching or water quenching. The tempering may preferably be performed at a temperature in a range of 150° C. to 250° C. to for about 30 minutes to 180 minutes. The post quenching-tempering bearing steel (bearing member) preferably contains tempered martensite into the inside thereof by about 90% or more in area ratio. Further, the steel preferably is preferably configured to have Vickers hardness of 700 to 800.

EXAMPLE

Steel ingots (30 kg) having chemical compositions shown in Table 1 was each subjected to vacuum smelting, and then to diffusion annealing at 1,250° C. for 30 hours, and the ingots was subjected to extend forging to be formed into φ60 mm round bar. Then, the round bar was subjected to normalizing at 990° C. for 2 hours, and then subjected to spheroidizing annealing in which the round bar was retained at 785° C. for 10 hours and gradually cooled at a rate of 15° C./h.

A fatigue test piece of 60 mm in diameter and 5.5 mm in thickness was roughly processed from the round bar steel that had been subjected to spheroidizing annealing. The roughly-processed test piece thus obtained was first retained at 840° C. for 30 minutes, which was then oil-quenched and further subjected to tempering at 180° C. for two hours. The roughly-processed test piece thus tempered was finish processed into a test piece of 60 mm in diameter and 5.0 mm in thickness. The test piece thus finish-processed was charged with hydrogen. To charge hydrogen, the test piece was held in a 20% ammonium thiocyanate ($NH_4SCN$) aqueous solution of 50° C. for 24 hours. The hydrogen amounts were measured at temperatures up to 600° C. through temperature programmed hydrogen analysis, to thereby confirm that the aforementioned condition allowed hydrogen of 0.5 mass ppm to penetrate into general SUJ2 steel (No. 1 steel in Table 1).

Each test piece thus obtained was subjected to rolling contact fatigue test using a thrust type rolling contact fatigue tester. The test was performed within 30 minutes after hydrogen was charged as described above so as to simulate the use in a hydrogen environment. The test was performed under the conditions where: Hertz stress was 3.8 GPa; stress loading late was 3,600 cpm, and turbine oil (FBK turbine #68, manufactured by JX Nippon Oil & Energy Corporation) was used for lubrication (at room temperature). The test was carried out 10 times for each steel type, and the resulting data was Weibull plotted, to thereby obtain $B_{10}$ life at which cumulative probability for fracture becomes 10%.

The rolling contact fatigue life $B_{10}$ obtained for each steel was divided by the value of the rolling contact fatigue life $B_{10}$ obtained for steel equivalent to SUJ2, to thereby obtain and evaluate the improvement of life relative to general steel ($B_{10}$ Life Ratio=$B_{10}$ Life/$B_{10}$ Life of Steel equivalent to SUJ2).

Further, each steel that had been subjected to outer periphery turning test to investigate machinability. The outer periphery turning test was performed using a P10 cemented carbide cutting tool without a lubricant under the following conditions.

Cutting Speed: 120 m/min (without a lubricant)
Feed Rate: 0.2 mm/rev
Cut Depth: 1.0 mm Under the above cutting conditions, the time that elapsed before the tool reached the flank wear of 0.2 mm was measured as the tool life. The tool life obtained for each steel was divided by the tool life obtained for steel equivalent to SUJ2, to thereby obtain and evaluate the reduction of the tool life relative to general steel (Tool Life Ratio=Tool Life/Tool Life of Steel equivalent to SUJ2).

The obtained results are shown in Table 1.

TABLE 1

| Steel Sample No. | Chemical Composition (mass %) | | | | | | | | | | | $B_{10}$ Life Ratio *1 | Tool Life Ratio *2 | Remarks |
|---|---|---|---|---|---|---|---|---|---|---|---|---|---|---|
| | C | Si | Mn | P | S | Al | Cr | Mo | N | O | Others | | | |
| 1 | 1.05 | 0.25 | 0.45 | 0.016 | 0.008 | 0.025 | 1.45 | — | 0.0031 | 0.0010 | — | 1.00 | 1.00 | Conventional Example |
| 2 | 0.91 | 0.35 | 1.05 | 0.016 | 0.008 | 0.025 | 2.00 | 0.23 | 0.0030 | 0.0015 | — | 5.17 | 1.00 | Inventive Example |
| 4 | 0.90 | 0.25 | 0.99 | 0.016 | 0.008 | 0.025 | 1.80 | 0.15 | 0.0040 | 0.0015 | — | 1.41 | 0.99 | Comparative Example |
| 6 | 0.91 | 0.61 | 0.98 | 0.016 | 0.009 | 0.024 | 1.80 | 0.15 | 0.0040 | 0.0015 | — | 5.17 | 0.97 | Inventive Example |
| 7 | 0.89 | 0.80 | 1.01 | 0.016 | 0.010 | 0.025 | 1.82 | 0.15 | 0.0030 | 0.0015 | — | 5.17 | 0.94 | Inventive Example |
| 8 | 0.90 | 0.85 | 1.02 | 0.016 | 0.009 | 0.025 | 1.80 | 0.15 | 0.0030 | 0.0015 | — | 5.17 | 0.75 | Comparative Example |
| 10 | 0.92 | 0.31 | 0.99 | 0.016 | 0.008 | 0.024 | 1.72 | 0.15 | 0.0030 | 0.0015 | — | 1.67 | 1.00 | Comparative Exatnple |
| 11 | 0.89 | 0.80 | 0.98 | 0.016 | 0.008 | 0.025 | 1.72 | 0.15 | 0.0035 | 0.0015 | — | 1.83 | 0.97 | Comparative Example |
| 12 | 0.92 | 0.30 | 1.00 | 0.016 | 0.009 | 0.025 | 1.80 | 0.14 | 0.0034 | 0.0015 | — | 1.17 | 1.00 | Comparative Example |
| 14 | 0.94 | 0.75 | 1.03 | 0.016 | 0.008 | 0.026 | 1.80 | 0.14 | 0.0040 | 0.0015 | — | 1.23 | 1.00 | Comparative Example |
| 15 | 0.91 | 0.78 | 0.96 | 0.016 | 0.008 | 0.025 | 2.50 | 0.14 | 00035 | 0.0015 | — | 2.00 | 0.95 | Comparative Example |
| 16 | 0.91 | 0.24 | 0.98 | 0.016 | 0.009 | 0.025 | 2.50 | 0.15 | 0.0035 | 0.0015 | — | 1.58 | 0.99 | Comparative Example |
| 17 | 0.87 | 0.30 | 1.00 | 0.016 | 0007 | 0.025 | 2.50 | 0.15 | 0.0037 | 0.0015 | — | 5.17 | 0.98 | Inventive Example |
| 18 | 0.90 | 0.80 | 1.01 | 0.016 | 0.008 | 0.025 | 2.50 | 0.15 | 0.0036 | 0.0015 | — | 6.00 | 0.92 | Inventive Example |
| 19 | 0.88 | 0.85 | 1.04 | 0.016 | 0.009 | 0.025 | 2.50 | 0.15 | 0.0034 | 0.0015 | — | 6.00 | 0.70 | Comparative Example |
| 20 | 0.93 | 0.25 | 1.03 | 0.016 | 0.010 | 0.025 | 2.70 | 0.15 | 0.0031 | 0.0015 | — | 1.83 | 0.78 | Comparative Example |
| 21 | 0.92 | 0.50 | 0.99 | 0.016 | 0.009 | 0.025 | 2.70 | 0.15 | 0.0032 | 0.0015 | — | 6.08 | 0.68 | Comparative Example |
| 22 | 0.85 | 0.35 | 1.05 | 0.016 | 0.008 | 0.025 | 1.83 | 0.45 | 0.0039 | 0.0015 | — | 5.33 | 0.68 | Comparative Example |
| 23 | 0.85 | 0.30 | 1.05 | 0.016 | 0.008 | 0.025 | 1.83 | 0.15 | 0.0039 | 0.0015 | — | 4.33 | 1.00 | Inventive Example |
| 24 | 1.10 | 0.80 | 1.05 | 0.016 | 0.009 | 0.025 | 2.40 | 0.38 | 0.0034 | 0.0015 | — | 6.20 | 0.91 | Inventive Example |
| 25 | 0.91 | 0.35 | 1.05 | 0.016 | 0.008 | 0.025 | 2.00 | 0.23 | 0.0031 | 0.0015 | Ti: 0.01 | 5.17 | 1.00 | Inventive Example |
| 26 | 0.92 | 0.34 | 1.05 | 0.016 | 0.008 | 0.025 | 1.90 | 0.24 | 0.0035 | 0.0015 | Ni: 0.6, Cu: 0.6 | 5.17 | 1.00 | Inventive Example |
| 27 | 0.91 | 0.35 | 1.05 | 0.016 | 0.009 | 0.024 | 1.90 | 0.22 | 0.0033 | 0.0015 | B: 0.0010 | 5.16 | 1.00 | Inventive Example |
| 28 | 0.90 | 0.34 | 1.05 | 0.016 | 0.009 | 0.026 | 2.00 | 0.23 | 0.0038 | 0.0015 | Ti: 0.01, B: 0.0010 | 5.18 | 1.00 | Inventive Example |

TABLE 1-continued

| Steel Sample No. | Chemical Composition (mass %) | | | | | | | | | | | $B_{10}$ Life Ratio *1 | Tool Life Ratio *2 | Remarks |
|---|---|---|---|---|---|---|---|---|---|---|---|---|---|---|
| | C | Si | Mn | P | S | Al | Cr | Mo | N | O | Others | | | |
| 29 | 0.92 | 0.34 | 1.98 | 0.016 | 0.008 | 0.025 | 2.01 | 0.22 | 0.0035 | 0.0014 | — | 5.17 | 0.99 | Inventive Example |
| 30 | 0.88 | 0.38 | 0.98 | 0.015 | 0006 | 0.023 | 1.90 | 0.38 | 0.0042 | 0.0011 | — | 5.28 | 0.97 | Inventive Example |

*1 $B_{10}$ Life Ratio: $B_{10}$ Life/$B_{10}$ Life of Steel equivalent to SUJ2 (Steel Sample of No. 1)
*2 Tool Life Ratio: Tool Life/Tool Life of Steel equivalent to SUJ2

As is apparent from Inventive Examples of Table 1, each steel satisfying the requirements of the present invention has the rolling contact fatigue life $B_{10}$ that is at least 4 times more as compared to Conventional Example (Steel Sample of No. 1; steel equivalent to SUJ2), and thus has an excellent hydrogen fatigue resistance property. Further, as is apparent from Inventive Examples of Table 1, each steel satisfying the requirements of the present invention has a tool life that is at least 0.9 times more as compared to Conventional Example, and thus has machinability substantially equal to that of general steel.

In contrast, Comparative Examples having chemical compositions out of the range defined by the present invention were all inferior to Inventive Examples either in rolling contact fatigue life $B_{10}$ or in tool life.

INDUSTRIAL APPLICABILITY

According to the present invention, the contents of Cr, Mo, and Si in the steel composition are particularly controlled to fall within proper ranges, to thereby provide bearing steel that is significantly excellent in hydrogen fatigue resistance property as compared to general bearing steel, as well as being excellent in workability in, for example, cutting work of the steel. As a result, the rolling contact fatigue life of the bearing can be significantly increased, which brings numerous benefits to the industry.

The invention claimed is:

1. Bearing steel having a chemical composition containing, by Mass %:
   C: 0.85% to 1.10%;
   Si: 0.30% to 0.80%;
   Mn: 0.90% to 2.00%;
   P: 0.025% or less;
   S: 0.02% or less;
   Al: 0.05% or less;
   Cr: 1.8% to 2.5%;
   Mo: 0.15% to 0.4%;
   N: 0.0080% or less;
   O: 0.0020% or less; and
   the balance being Fe and incidental impurities.

2. The bearing steel according to claim 1, wherein the chemical composition further contains, by mass %, at least one element selected from:
   Ti: 0.01% or less;
   Ni: 0.10% or less;
   Cu: 0.10% or less; and
   B: 0.0010% or less.

* * * * *

UNITED STATES PATENT AND TRADEMARK OFFICE
CERTIFICATE OF CORRECTION

| | | |
|---|---|---|
| PATENT NO. | : 8,894,779 B2 | Page 1 of 1 |
| APPLICATION NO. | : 13/821729 | |
| DATED | : November 25, 2014 | |
| INVENTOR(S) | : Hirai et al. | |

It is certified that error appears in the above-identified patent and that said Letters Patent is hereby corrected as shown below:

On the Title Page

Page 2, item [56] Line 13 under "Foreign Patent Documents"

Change "JP    S-62-247055    11/1987" to -- JP    S-62-274055    11/1987 --.

Signed and Sealed this
Tenth Day of March, 2015

Michelle K. Lee
*Deputy Director of the United States Patent and Trademark Office*